US007302318B2

(12) United States Patent
Gerrity et al.

(10) Patent No.: US 7,302,318 B2
(45) Date of Patent: Nov. 27, 2007

(54) METHOD FOR IMPLEMENTING REQUIRED NAVIGATIONAL PERFORMANCE PROCEDURES

(75) Inventors: Daniel A Gerrity, Bellevue, WA (US); Jason E Dougherty, Renton, WA (US); John H Andersen, Tacoma, WA (US); Stephen D Fulton, Federal Way, WA (US)

(73) Assignee: Naverus, Inc., Renton, WA (US)

( * ) Notice: Subject to any disclaimer, the term of this patent is extended or adjusted under 35 U.S.C. 154(b) by 39 days.

(21) Appl. No.: 11/372,565

(22) Filed: Mar. 10, 2006

(65) Prior Publication Data

US 2006/0253232 A1 Nov. 9, 2006

Related U.S. Application Data

(60) Provisional application No. 60/662,133, filed on Mar. 10, 2005.

(51) Int. Cl.
*G06F 19/00* (2006.01)

(52) U.S. Cl. .......................... 701/16; 701/18; 701/301; 340/903; 340/970

(58) Field of Classification Search .................... 701/4, 701/8, 9, 16, 18, 301; 340/963, 970, 903, 340/438
See application file for complete search history.

(56) References Cited

U.S. PATENT DOCUMENTS 5,719,567 A 2/1998 Norris
6,377,892 B1 4/2002 Johnson et al.
6,571,155 B2 5/2003 Carriker et al.
6,785,594 B1 * 8/2004 Bateman et al. .............. 701/9
6,816,780 B2 11/2004 Naimer et al.
6,970,784 B2 11/2005 Shinagawa
6,980,892 B1 * 12/2005 Chen et al. .................... 701/9
6,995,690 B1 2/2006 Chen et al.
2004/0119638 A1 6/2004 Fagan et al.

OTHER PUBLICATIONS

"Airworthiness and Operational Approval for Special Required Navigation Performance (RNP) Procedures With Special Aircraft and Aircrew Authorization Required (SAAAR)," *Notice N 8000. 287*, U.S. Department of Transportation, Federal Aviation Administration, Washington, D.C., Jul. 8, 2004.

(Continued)

*Primary Examiner*—Gertrude A. Jeanglaude
(74) *Attorney, Agent, or Firm*—Christensen O'Connor Johnson Kindness PLLC

(57) ABSTRACT

A method (200) is disclosed for designing an RNP approach for an aircraft at a particular runway (90). The method includes selecting a runway (201), gathering obstacle data for the obstacle evaluation area (202), selecting a VEB method and terms (204), laying out a preliminary approach, inducing a missed approach segment (206), calculating a preliminary obstacle clearance surface (208), calculating a momentary descent segment using a physical model of the aircraft (210), adjusting the obstacle clearance surface so that no obstacles intersect the surface (212), and optionally optimizing the approach by departing from the operator's standard procedures (214). Preferably, the obstacle clearance surface is adjusted so that it just touches an obstacle, without any object intersecting the surface, thereby providing an optimal decision altitude.

12 Claims, 3 Drawing Sheets

OTHER PUBLICATIONS

"Roadmap for Performance-Based Navigation: Evolution for Area Navigation (RNAV) and Required Navigation Performance (RNP) Capabilities 2003-2020," U.S. Department of Transportation, Federal Aviation Administration, Washington, D.C., Version 1.0, Jul. 2003.

"Update to Roadmap for Performance-Based Navigation: Evolution for Area Navigation (RNAV) and Required Navigation Performance (RNP) Capabilities 2006-2025," U.S. Department of Transportation, Federal Aviation Administration, Washington, D.C., Industry Coordination Draft, Dec. 2005.

* cited by examiner

METHOD FOR IMPLEMENTING REQUIRED NAVIGATIONAL PERFORMANCE PROCEDURES

CROSS-REFERENCE TO RELATED APPLICATION

This application claims the benefit of U.S. Provisional Patent Application No. 60/662,133, filed on Mar. 10, 2005, the disclosure of which is hereby expressly incorporated by reference in its entirety, and priority from the filing date of which is hereby claimed under 35 U.S.C. § 119.

FIELD OF THE INVENTION

The present invention is related to aircraft flight path design, and more particularly to final approach procedure design.

BACKGROUND

In commercial aviation, the ability to accurately pinpoint an aircraft's position is important to safe and efficient air travel. Originally, pilots relied on visual cues to avoid obstacles during take-off and approach to landing. However, weather conditions often hinder the pilot's ability to see such objects. Consequently navigational procedures were developed to guide the aircraft into and out of terminal area which require only position information and not visual cues. Currently, airlines typically use ground based radio navigation systems to provide position information, particularly during poor visibility conditions. A disadvantage of ground-based radio positioning systems, however, is that such systems are not particularly accurate and provide less certainty of an aircraft's position the farther the aircraft is from the transmitter. Recognizing this limitation, regulators have established a set of criteria for building these navigational procedures called TERPS (Terminal Instrument Procedures) for designing approaches that recognize the limitations of the technology. TERPS employs trapezoidal obstacle identification surfaces that take into account inaccuracies in the aircraft's positional certainty. TERPS is formally defined in US FAA Order 8260.3B, along with associated documents in the 8260 series. The international equivalent of TERPS is called PANS-OPS, promulgated by the International Civil Aviation Organization ("ICAO") (document 8168); the two combined represent virtually 100% of conventional approaches in place today. Such obstacle identification surfaces generally extend from the final approach fix, a point in space from which an approach begins, to a go-around decision altitude, or missed approach point. If a prospective obstacle identification surface would intersect an obstacle, the proposed surface (and therefore the flight path) must be offset or otherwise modified, which can result in the aircraft being in an undesirable position relative to the runway.

The missed approach point or decision altitude, in general terms, is the lowest point during an approach procedure wherein the obstacle identification surface clears all obstacles. If the aircraft landing conditions do not meet the requirements for a successful landing (e.g., visual contact with the runway environment, landing clearance, etc.), then the pilot makes a go-around decision and typically at the missed approach point the aircraft transitions to a missed approach surface that is similarly designed to provide for a safe extraction for a generic aircraft. In an obstacle rich environment, however, TERPS surfaces may not provide sufficient clearance to allow guidance all the way down to a decision altitude. In these cases, a non-precision approach is used that only provides guidance down to a particular minimum descent altitude. If the landing must be aborted below the minimum descent altitude, TERPS does not provide a missed approach surface. If an instrument approach is not available, the flight crew typically executes a circling procedure, which can present undue risk to the aircraft when conducted during low visibility. It is estimated that more than half of all aviation accidents involving controlled flights into terrain occur during such non-precision approaches, and that an aircraft is five times more likely to experience an incident during a non-precision approach.

Containment volumes (the protected volume enclosed by the obstacle identification surfaces) for traditional criteria sets such as TERPS and PANS-OPS have been established essentially through empirical analysis and experience and have been deemed safe due to the large number of operations that have been accomplished safely within these volumes. Navigation systems have improved by orders of magnitude over earlier technologies and permit much tighter containments than previously available. Public design criteria sets necessarily evolve slowly and have not kept up with these new navigation capabilities.

An alternative to TERPS for designing approaches is emerging, known as performance-based navigation. Under this concept, optimal flight paths are designed based on the aircraft's capabilities and not on the characteristics of the navigational signals. This permits advanced aircraft to execute advanced procedures and confers access, safety, efficiency, and capacity benefits to well-equipped aircraft. RNAV is a type of navigation that permits operation on any desired flight path (as opposed to point to point based on navigation beacons) within the limits of the available signals. Required Navigation Performance ("RNP") is a term used to describe performance-based RNAV.

RNP is a new navigation method that requires a new means of understanding safety. In a sense, RNP inverts the safety function; instead of specifying the performance limitations of a particular navigational aid and then designing safe procedures around that, RNP procedures define the safe buffers required for an optimum procedure which in turn drives the requirements for the navigation system performance on the aircraft. In this way, procedures can be designed that are demonstrably safe, but can only be flown in aircraft that are known to possess sufficient navigation system accuracy and integrity. The essential question being answered by a conventional procedure is "what is the best way in, given the characteristics of the underlying navigational needs?", whereas the essential question for an RNP procedure is "what level of performance is required to execute the safest and most efficient path to the runway?"

RNP is a statement of the navigation performance necessary for operation within a defined airspace. RNP navigation permits aircraft operation on any desired flight path, with clearly defined path specifications using navigation aids such as the global positioning system, and/or within the limits of the self-contained capability, such as inertial navigation systems. Modern systems are allowing carriers to transition from TERPS-based approach and landing procedures to more flexible linear surfaces developed using RNP, providing carriers with precision approach capability. A critical component of RNP is the ability of the aircraft navigation system to accurately monitor its achieved navigation performance and to ensure that it complies with the accuracy required for a specific route or airspace. It is estimated that 80% of the existing airline fleet is equipped with the flight management systems, navigation systems like DME, GPS, and INS, and the altimetry that is needed to implement RNP.

RNP-based approach and departure procedures provide important safety and performance benefits including the ability to complete a safe instrument approach on any available runway during poor visibility. Safety is enhanced by providing vertical guidance all the way through the entire procedure. Shorter, more direct routes are possible that save significant time and fuel. Airspace capacity is improved by permitting reduced separation standards for well-equipped aircraft. Air traffic control benefits from safe and predictable aircraft paths in both visual and instrument flight rule conditions, and the airports and airliners no longer need to rely on ground based landing systems.

There remains a need for improved methods for determining a safe corridor for aircraft approaching a landing that provides an efficient approach without negatively impacting acceptable levels of safety.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for designing an approach for a selected runway is disclosed. The method includes gathering data regarding the height and location of all obstacles, natural and man-made, within an obstacle evaluation area. A preliminary approach path is laid out for the runway, including a missed approach segment, and a corresponding obstacle clearance surface is calculated. In the preferred method the obstacle clearance surface includes a portion underlying the desired fixed approach segment, and may be calculated using a vertical error budget approach. The obstacle clearance surface includes a missed approach segment, that the aircraft will follow in the event the runway is not visually acquired by the time the aircraft reaches a decision altitude. A momentary descent segment extends between the first segment and the missed approach, and is calculated on physical principles to approximate the projected path of the aircraft during the transition from its location at the decision altitude to the missed approach segment.

The preliminary path is then tested to insure that no obstacles penetrate the missed approach surface, and may be improved, e.g. lowering the decision altitude, by adjusting the obstacle clearance surface until it just touches an obstacle.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
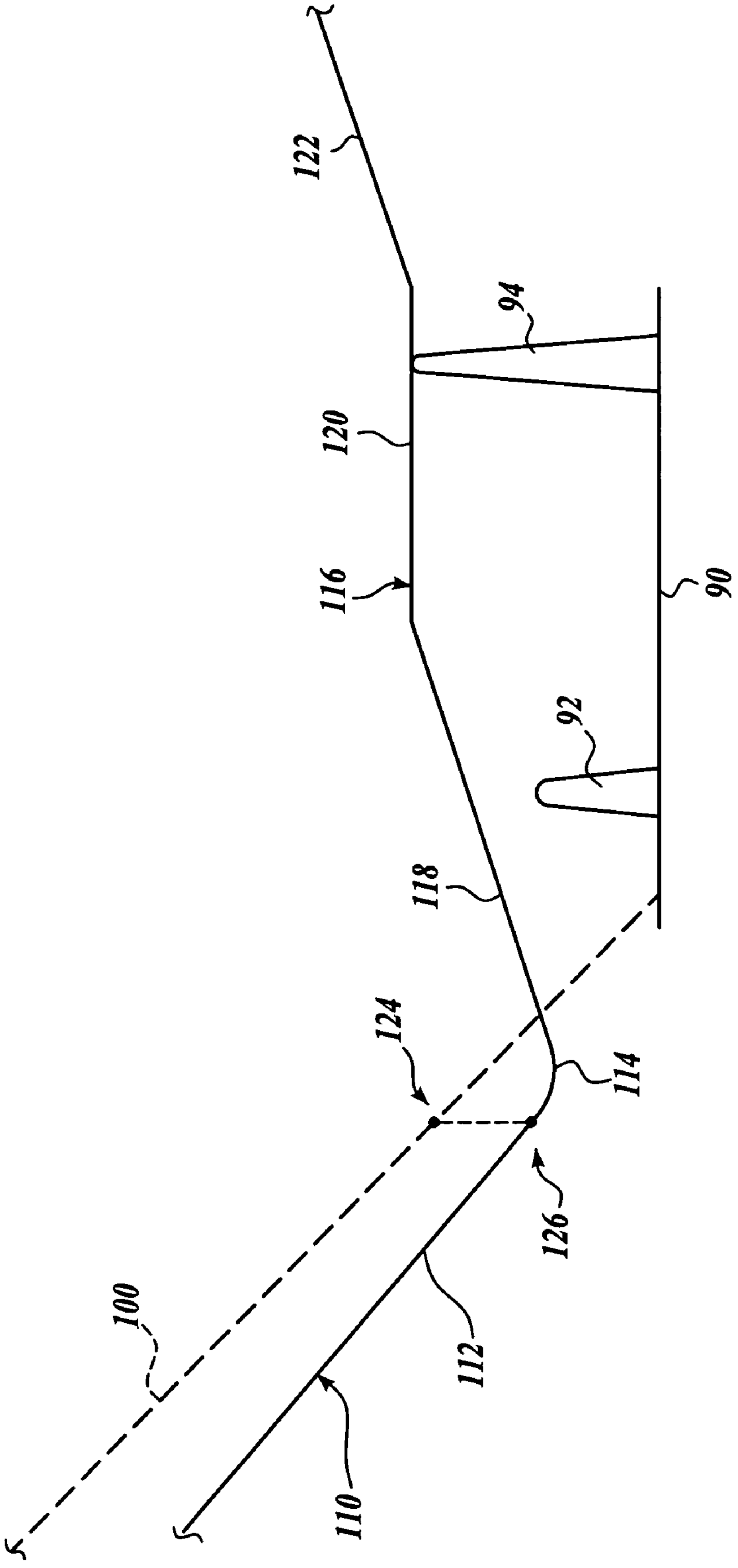
FIG. 1 is a sketch schematically showing a runway and generic obstacles near the runway, and showing an approach profile developed in accordance with the present invention.

Modern commercial aircraft typically include very accurate, on-board global positioning systems. For example, a Boeing 737 NG equipped with the Smiths Management System continually calculates positional uncertainty on board the aircraft. The system is constantly updated by the global positioning system ("GPS") to ensure continuity and maintain positional accuracy. Multimode receivers process the data and display the aircraft's actual navigation performance ("ANP") to the flight crew in real-time. As a result, the corridor of positional uncertainty that such an aircraft traverses is much smaller than what would be obtained using conventional ground-based radio positioning systems. During an approach the ANP may be compared to a predefined criteria called the required navigation performance ("RNP"), to provide dramatically improved guidance and protection right down to the runway.

ANP is a function of accuracy, availability and integrity. Navigation systems must determine position accurately. They must also provide such information only when the information is valid—that is, they must operate with integrity and must be available continuously when needed. The continuity of a system, according to RTCA DO-236B, is the capability of the total system (comprising all elements necessary to maintain aircraft position within the defined airspace) to perform its function without non-scheduled interruptions during the intended operation. The continuity risk is the probability that the system will be unintentionally interrupted and not provide guidance information for the intended operation. More specifically, continuity is the probability that the system will be available for the duration of a phase of operation, presuming that the system was available at the beginning of that phase of operation. The availability of a navigation system, per DO-236B is the percentage of time that the services of the system are within required performance limits. Availability is an indication of the ability of the system to provide usable service within the specified coverage area. Signal availability is the percentage of time that the navigational signals transmitted from external sources are available for use. Availability is a function of both the physical characteristics of the environment and the technical capabilities of the transmitter facilities.

The following definitions will aid the reader in understanding the following description.

Approach Surface Baseline ("ASBL"): A line aligned to the runway centerline ("RCL") that lies in a plane parallel to a tangent to the orthometric geoid at the landing threshold point ("LTP").

Decision Altitude/Height ("DA(H)"): The DA(H) is the altitude at which a missed approach must be initiated if the visual references required to continue the approach are not acquired. For RNP operations, the DA(H) is determined using the vertical error budget, except that a minimum DA(H) may be imposed, for example 200 feet above touchdown. The decision altitude (DA) is expressed in feet above mean sea level and the companion decision height (DH) is expressed in feet above touchdown zone elevation. The combination, DA(H) is presented by the DA followed by the DH in parentheses, e.g., 1659 (250).

Final Approach Fix ("FAF"): The FAF marks the point of glide path intercept and the beginning of the final approach segment descent.

Final Approach Segment ("FAS"): The FAS begins at the FAF and ends at the landing threshold point. Typically, but not necessarily, the FAS is aligned with the extended runway centerline.

Glide Path Angle ("GPA"): The GPA is the angle of the specified final approach descent path relative to the ASBL Landing Threshold Point ("LTP"): The point where the runway centerline intersects the runway threshold is known as the LTP.

Momentary Descent: The flight path, including the height loss, immediately after the DA(H) on initiation of a missed approach go-around and prior to achieving the desired climb rate.

Obstacle Evaluation Area ("OEA"): An OEA is the airspace within the lateral RNP segment width limits within which obstructions are evaluated by application of the obstacle clearance surface.

Required Navigation Performance ("RNP"): RNP (typically expressed in nautical miles) is a statement of the navigational performance required to maintain flight within the OEA associated with a particular procedure segment.

Required Obstacle Clearance ("ROC"): ROC is the minimum vertical clearance that must exist between aircraft and the highest ground obstruction or obstacle within the OEA of instrument procedure segments. ROC is applied in en route, feeder, initial, and intermediate segments as a specified value, constant over the length of the segment. The VEB ROC (in RNP approaches) is applied on the final segment as a function of distance from the LTP.

Vertical Error Budget (VEB): For the FAS, a variable ROC is applied. The specific value of the FAS ROC is a function of many variables, the most important of which are distance from the LTP, the temperature, the elevation of the LTP, the RNP level, and the glide path angle. The VEB is defined by a vertical error budget equation that characterizes the total amount of error resulting from the components of the vertical navigation system. Application of this VEB equation determines the minimum amount of vertical clearance that must exist between the aircraft on the nominal glide path and ground obstructions within the OEA of the FAS.

Visual Segment: That portion of the final segment between the DA(H) and the LTP.

An approach design for a particular runway may include a number of well-defined segments that the aircraft will follow to touch down. For example, a typical RNP approach may include: 1) an approach feeder segment; 2) an initial approach segment; 3) an intermediate approach segment; 4) and a final approach segment. In addition, a missed approach segment is included in the approach design, providing an exit profile in the event the aircraft must abandon a landing attempt.

The approach feeder segment provides the transition from an en route environment to the initial approach segment. Descents from cruise altitude are initiated on this segment, so attention is given to the minimum altitudes in order that the flight management computer idle path descent and deceleration computations can function unconstrained. A typical approach feeder segment may have an RNP of 1.0 nautical miles (nm), a required obstacle clearance of 1,000-2,000 feet, and a minimum altitude determined by adding the ROC to obstacle heights and adjustments to the obstruction elevation within the obstacle evaluation area.

The initial approach segment provides a smooth transition from the approach feeder segment to the intermediate approach segment. The primary design factors to consider are the judicious use of airspace considering obstacle clearance, the elevation loss desired, and the distance required to decelerate. The particular geometry of the initial approach segment is quite flexible to achieve desired performance and safety goals. In an exemplary approach design procedure the initial segment is limited to a maximum of 50 nm, and has an RNP of 0.3 nm, unless some operational improvement requires a smaller value, an ROC of 1,000 feet, and a minimum altitude that is determined in a manner similar to that described above for the approach feeder segment.

The intermediate approach segment provides a smooth transition from the initial approach segment to the final approach segment. The primary design factors for the intermediate approach segment are the judicious use of airspace considering obstacle clearance, and the desired elevation loss with respect to distance. The geometry of the intermediate approach segment is also very flexible, allowing an RNP approach to follow any appropriate path to achieve operational and safety goals. In an exemplary approach design the intermediate approach segment is limited to 15 nm in length, and utilizes the same RNP as the initial approach segment (e.g., RNP 0.3). A minimum ROC for the intermediate approach segment may be 500 feet.

In a preferred design method, the obstacle clearance requirement for the final approach segment is based on the vertical navigation ("VNAV") path definition and guidance capability of the aircraft systems. The FAF is defined as the VNAV Intercept Point and the VNAV Intercept Altitude is defined as the minimum altitude of the intermediate segment terminating at the FAF. Although in the design of an RNP approach the final approach segment geometry is still somewhat flexible, the FAS must obviously terminate at the LTP, and is preferably aligned within three degrees of the runway centerline. Turns may be made in the FAS, but consideration must be given for the location of the DA(H) with respect to turns. In a preferred approach the DA(H) will be located on a straight portion of the FAS, although it is contemplated that in unusual situations the DA(H) may be located in a turning portion of the FAS. The optimum length of the FAF is five to seven nautical miles, although it may be longer or shorter. In a preferred design procedure the FAF is constrained to be not less than 0.3 nm in length. The width of the FAS is preferably the same as the intermediate approach segment (e.g. RNP 0.3), and the required obstacle clearance may be determined using a VEB procedure, such as that described below.

In a preferred method, the final approach segment is designed with a vertical glide path angle (GPA). Final approach segments have a ROC that is calculated by mathematically combining independent contributors to inaccuracies in the vertical path of the airplane. This combination is referred to as the vertical error budget, or VEB. The variance of a combination of independent Gaussian distributions with mean zero is equal to the root mean square sum of the variances of the individual Gaussian contributors (the "root sum square"). The final ROC is computed by adding the bias (i.e., non-Gaussian) contributors to the root sum square of the Gaussian contributors.

For example, the barometric error correction is not included root sum square term because it does not have a zero mean. The body geometry error is not included in the root sum square calculation for historical reasons. These corrections are added separately to the root sum square value.

The ROC defined by this VEB is subtracted from the height of the nominal glide path to define the FAS obstacle clearance surface. A methodology for calculating the VEB can be found in FAA Notice 8000.287 and its successor FAA Notice 8000.300, "Airworthiness and operational approval for special required navigation performance (RNP) procedures with special aircraft and aircrew authorization required (SAAAR)," which is hereby incorporated by reference, in its entirety.

An important part of the approach design is the DA(H) determination. The DA(H) is the altitude in the approach at which a missed approach must be initiated if the visual references required to continue the approach into the visual segment are not acquired. In other words, the DA(H) must be at an altitude wherein if the pilot initiates a missed approach procedure, the aircraft can (to a very high probability) safely climb away without encountering either the ground or any other obstacle. More particularly, the DA(H) must be sufficiently high that even in very unusual circumstances, such as the loss of an engine coupled with the aircraft maximum deviation below the nominal approach path, the aircraft can safely egress the runway area. On the other hand, the lowest DA(H) that provides the desired level of safety is preferred, in order to minimize the number of missed approaches that must be executed. It will be readily appreciated that unnecessary missed approaches are undesirable for safety, efficiency and airport logistics reasons.

The DA(H) is determined by evaluation of the missed approach surface as it originates from the final segment obstacle clearance surface ("OCS"). The OCS, as applied to the approach procedure, comprises the obstacle clearance surface calculated below the FAS using the VEB to the point of DA(H), a momentary descent portion and a missed approach segments. All three of these portions or segments make up the OCS.

To determine the DA(H), the VEB calculation is used in conjunction with the missed approach climb profile. The ROC is determined by the final approach VEB calculation, and may include a fixed ROC (e.g., 35 ft) from the net climb profile, wherein the "net climb" is typically an aircraft-specified gross climb rate, reduced by a fixed amount to produce a conservative net climb profile. For example, in the current embodiment of the method the net climb is the gross climb reduced by 0.8% gradient, although it is contemplated that the method may be utilized with a different decrement, or without any decrement, in calculating the net climb profile.

At the DA(H), the missed approach profile is used to begin determining obstacle clearance. The lowest DA(H) is the point at which an obstacle just touches the OCS, and no obstacle penetrates the OCS. It will be appreciated, that in the first few seconds of the missed approach the aircraft experiences a momentary descent generally resulting from the momentum of the aircraft on the glide path. In conventional approach designs, to account for this momentary descent the aircraft is assumed to travel on the glide path after the DA(H) for some distance and then an initial missed approach climb gradient is applied. These conventional assumptions are not based on the performance of any given aircraft, are not physically realistic, and do not necessarily result in a conservative calculation.

The point of performance-based navigation is to use the actual performance characteristics of the aircraft to determine the safest path. All conventional approaches, and the RNP criteria published by ICAO and the FAA depend on a generic aircraft for the missed approach segment of approaches. At best, this is limiting, at worst, it is unsafe.

In a preferred embodiment of the present method, the momentary descent is modeled using a more realistic, physical model of the actual expected path of the aircraft from the DA(H), using the flight conditions (such as airspeed, aircraft weight, and glide path angle), and the aircraft performance parameters (such as engine take-off thrust and engine spool up from approach thrust). Using the engine thrust ramp from the initial thrust to the final takeoff thrust, the energy the engine contributes to the vertical momentum can be determined. Another useful assumption is that the aircraft does not lose any airspeed (i.e., the kinetic energy is constant).

In the present model, the aircraft velocity, drag, weight and rate of change of thrust (the thrust ramp) are modeled as constants. Then the thrust, T, may be modeled as:

$$T = T_i + \Delta T \cdot t = T_i + \Delta T \cdot \frac{x_g}{V_g}$$

where, $T_i$=instantaneous thrust (lbf);

αT=thrust ramp (lbf/s);

t=time (s);

$x_g$=horizontal position from DA(H) relative to ground (ft);

$V_g$=ground speed (ft/s).

The rate of climb is defined as the excess power divided by the aircraft weight. For a more conservative analysis, consistent with other regulatory models, the calculated rate of climb is reduced by 0.8/100 to provide a conservative so-called net rate of climb. Then, $$RC = \frac{T - D}{W} - 0.8/100$$

where,

RC=net rate of climb;

D=aircraft drag (lbf, assumed constant);

W=aircraft weight (lbf).

The change in height or altitude, with respect to DA(H), may then be calculated as:

$$\Delta H = \int_0^{x_o} RC\,dx$$

It will now be readily apparent that, with a constant speed assumption, the aircraft is calculated to follow a generally parabolic flight path during momentary descent. In the preferred method the OCS is based on this calculated aircraft trajectory until the first stage of flap retraction has finished (usually between 2 and 4 seconds from the DA(H)). After the first stage of flap retraction the thrust continues to ramp if full takeoff thrust has not been reached. In the preferred model, the engine is assumed to fail when the flaps have retracted to the approach climb configuration. The remainder of the missed approach is then the usual approach climb profile (single engine/gear up).

Refer now to FIG. 1, which shows a sketch including a profile of a final approach and obstacle clearance surface, to more clearly explain the present method. A runway 90, a first upwardly-projecting obstacle 92 and a second upwardly-projecting obstacle 94 are shown. It will be appreciated that the obstacles 92, 94 may be natural topological elevation changes, other natural obstacles such as trees, or man-made obstacles. Of course, in general the obstacles 92, 94 are typically not on the runway 90 nor are they typically directly adjacent the runway 90. The dashed line 100 indicates the track profile for the FAS, the nominal path that the aircraft would follow to a landing on the runway 90.

An OCS 110 includes a first portion 112 directly underlying the final approach segment 100, a generally parabolic momentary descent portion 114, and a missed approach segment 116 including a first climb portion 118, a level portion 120 and a second climb portion 122. The length of the first climb portion 118 is typically specified by the standard operational procedures of the aircraft operator. The DA(H) is indicated at 124 and is the minimum elevation at which the pilot must execute a missed approach if the conditions are not suitable for landing. The point on the OCS 110 directly below the DA(H) 124 is indicated by 126, and this is the lowest altitude that the aircraft is expected to be based on the VEB and assuming all of the position errors are in the negative direction (i.e., below the aircraft). The point 126, therefore is located at the intersection of the first portion 112 of the OCS 110 and the momentary descent portion 114.

The momentary descent is calculated based on a physical model of the aircraft flight performance characteristics, for example as outlined above, assuming the aircraft begins at the point 126. After the momentary descent portion 114, the aircraft climbs to a prescribed altitude along the first climb portion 118 and then levels out along the level portion 120, before resuming a climb along the second climb portion 122 of the missed approach segment 116. Generally the missed approach segment 116 is aligned with the flight track of the FAS to the LTP (normally along the extended centerline of the runway) and continues down the runway centerline to the initial missed approach waypoint. The initial missed approach waypoint is located no closer than the opposite end of the runway. Clearly, the DA(H) 124 must be selected such that no obstacle in the area, e.g. 92, 94 penetrates any portion of the obstacle clearance surface 110.

A preferred method 200 of designing a RNP approach procedure for an aircraft will now be described with reference to FIG. 2. First, a runway is selected for which an RNP approach procedure is desired 201. Topographic and obstacle data, including man-made and natural obstacles, are gathered for the obstacle evaluation area around the selected runway 202. A VEB method is then selected 204, for example the method described in FAA Notice 8000.287, as discussed above.

Specific terms for the VEB method are also obtained or selected, such as the RNP level and aircraft-specific inputs. A preliminary final approach segment and engine-out missed approach track is laid out 206, generally over the lowest possible terrain and obstacles, e.g. down valleys and not over hills, and including a preliminary DA(H). A preliminary obstacle clearance surface is then calculated 208, accounting for flap retractions, accelerations, thrust changes, and actual climb performance for a particular aircraft. The momentary descent is calculated 210, using a physical model of the aircraft performance such as a thrust ramp, and considering flap configuration changes. As discussed above, the momentary descent calculation typically produces a parabolic-shaped momentary descent rather than the triangle shaped gutter that is used in conventional designs.

The VEB calculation, momentary descent calculation and missed approach calculation define the OCS. Using the data from the steps above, the OCS may be adjusted (e.g. slide the DA(H) point for the momentary descent and missed approach profiles along the portion of the OCS defined by the VEB) until the obstacle clearance surface just touches an obstacle, but no obstacles intersect the obstacle clearance surface 210. Referring again to FIG. 1, if in the preliminary design the OCS 110 is intersected by an obstacle 92, 94, then the target safety levels are not met, and the DA(H) must be raised. Alternatively, if in the preliminary design the obstacle clearance surface 110 does not touch any obstacle, the DA(H) 124 is higher than the optimal position. In that case, the approach design is modified to provide a more optimal approach. For example, the designer may move or 'slide' the initial point 126 of the momentary descent portion 114 downwardly along the (extended) first portion 112 of the obstacle clearance surface 110 until a portion of the OCS 110 just touches an obstacle 92, 94. The DA(H) is then determined as the point on the final approach segment 100 directly above the initial point 126.

Figure 2:
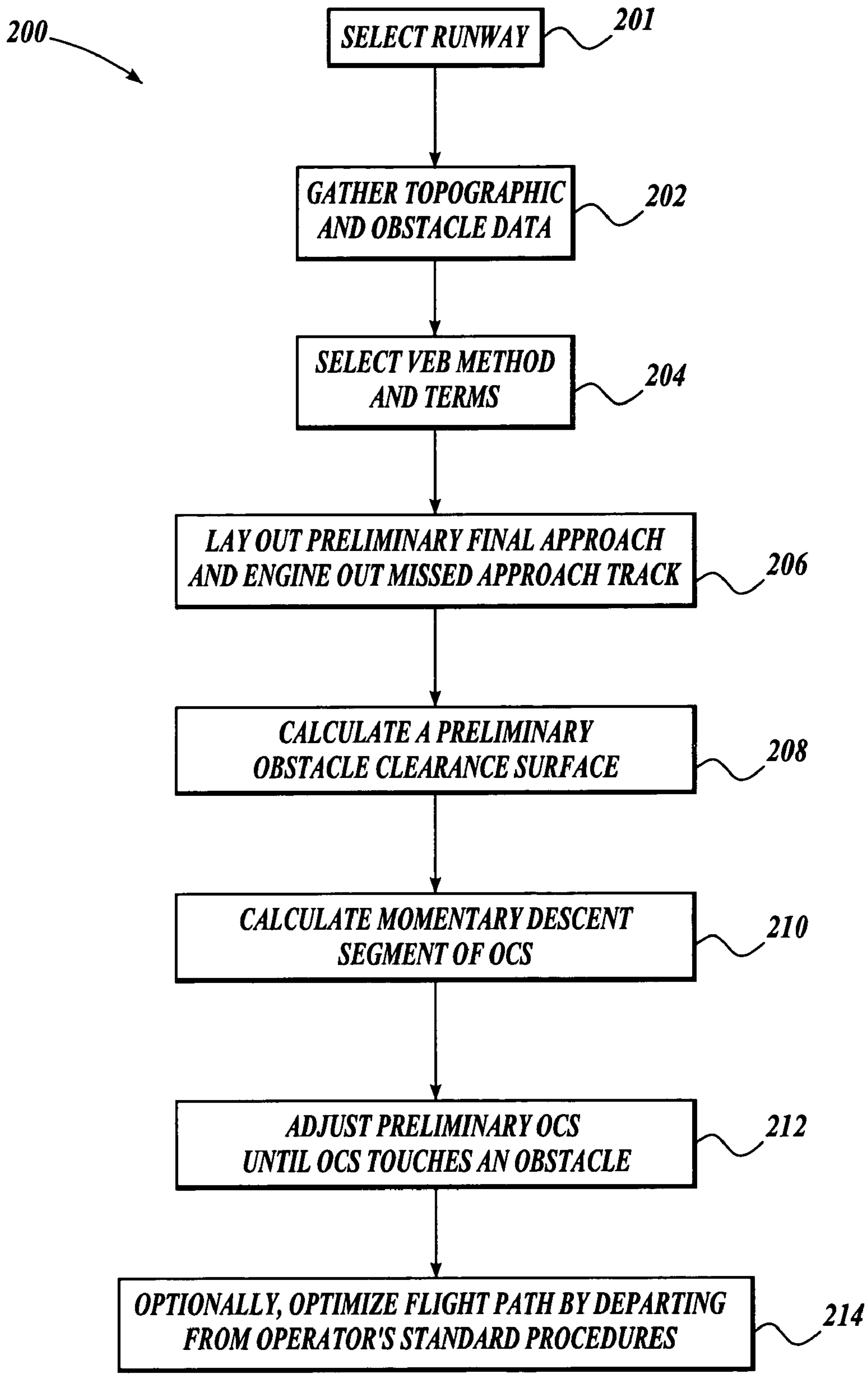
FIG. 2 is a flow chart showing steps in a currently preferred embodiment of a method for designing an approach profile, including the missed approach segment.
Figure 3:
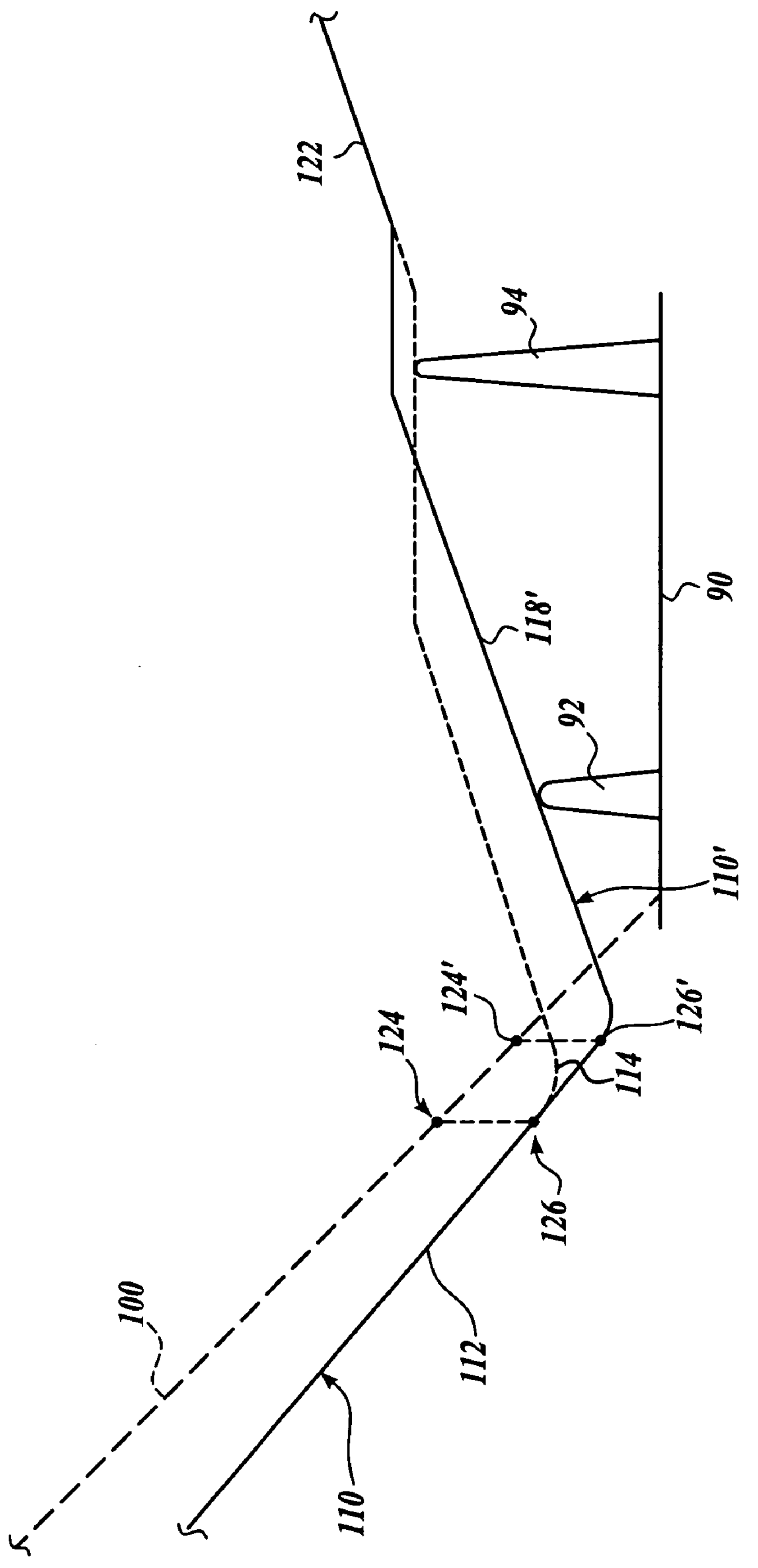
FIG. 3 is a sketch similar to FIG. 1, and showing a method for further optimizing the approach design.

Referring now to FIGS. 2 and 3, it is contemplated that in some instances it may be possible to lower the DA(H) further by creating a profile for the missed approach segment that deviates from the operators standard operating procedures 214. For example, FIG. 3 shows the obstacle clearance surface profile 110 from FIG. 1, partially in phantom, and a modified obstacle clearance surface profile 110' wherein the new DA(H) 124' is further down the final approach segment 100, and the modified first climb portion 118' just touches the first obstacle 92, and extends for a longer distance than the original first climb portion 118. In this modified obstacle clearance profile 110' the DA(H) 124' is significantly lower, which should result in fewer required missed approaches, without adversely affecting the aircraft safety.

While illustrative embodiments have been illustrated and described, it will be appreciated that various changes can be made therein without departing from the spirit and scope of the invention.

The invention claimed is:

1. A method for designing an approach path for an aircraft approaching a particular runway comprising the steps:

selecting a runway;

gathering topographic data for an obstacle evaluation area for the selected runway, identifying all upwardly projecting obstacles in the obstacle evaluation area;

laying out a preliminary approach path to the runway, including a missed approach segment;

calculating an obstacle clearance surface for the preliminary approach path;

calculating a momentary descent portion of the obstacle clearance surface;

adjusting the obstacle clearance surface such that none of the identified obstacles intersects the obstacle clearance surface, wherein the obstacle clearance surface comprises a final approach obstacle clearance segment, a momentary descent segment and a missed approach segment.

2. The method of claim 1, wherein the missed approach segment includes a first climb segment, a level segment and a second climb segment.

3. The method of claim 1, wherein the final approach obstacle clearance segment is calculated using a vertical error budget approach.

4. The method of claim 1, wherein the momentary descent segment is calculated using a physical model of the aircraft performance.

5. The method of claim 1, wherein the momentary descent segment is calculated by modeling the engine ramp up and the aircraft momentum.

6. The method of claim 1, wherein the momentary descent segment is modeled as a parabolic segment that accounts for the aircraft downward momentum along a glide path.

7. The method of claim 1, wherein adjusting the obstacle clearance surface comprises shifting the obstacle clearance surface along the preliminary approach path until the obstacle clearance surface just touches one of the identified obstacles.

8. The method of claim 2, wherein the length of the first climb segment of the missed approach segment is initially established by an operator's standard procedures.

9. The method of claim 8, further comprising the step of further adjusting the obstacle clearance surface by extending the first climb segment of the missed approach segment in order to reduce the decision altitude.

10. A method for designing an aircraft RNP approach for a particular runway having an obstacle evaluation area and a plurality of upwardly-extending obstacles in the obstacle evaluation area, the method comprising the steps:

laying out a preliminary final approach segment;

calculating a first portion of an obstacle clearance surface underlying the preliminary final approach segment using a vertical error budget calculation;

laying out a missed approach segment having a first climb segment that intersects the first portion of the obstacle clearance surface, and such that none of the plurality of upwardly-extending obstacles intersect the missed approach segment;

calculating a momentary descent segment having an initial point on the first portion of the obstacle clearance surface and an end point on the missed approach segment, the momentary descent segment modeling the aircraft calculated flight path from initiation of a go-around from the initial point, wherein the initial portion of the obstacle clearance surface, the momentary descent segment and the missed approach segment define the obstacle clearance surface;

adjusting the obstacle clearance surface by sliding the initial point along the first portion of the obstacle clearance surface such that the obstacle clearance surface touches at least one of the plurality of obstructions and none of the plurality of obstructions intersect the obstacle clearance surface; and identifying a decision altitude point at the point along the final approach segment vertically directly above the initial point.

11. The method of claim 10, wherein the missed approach segment includes a first climb segment, a level segment and a second climb segment.

12. The method of claim 10, wherein the momentary descent segment is calculated by modeling the engine ramp up and the aircraft momentum.

* * * * *

US007302318C1

(12) INTER PARTES REEXAMINATION CERTIFICATE (0324th)

United States Patent (10) Number: US 7,302,318 C1

Gerrity et al. (45) Certificate Issued: Nov. 29, 2011

(54) METHOD FOR IMPLEMENTING REQUIRED NAVIGATIONAL PERFORMANCE PROCEDURES

(75) Inventors: Daniel A Gerrity, Bellevue, WA (US); Jason E Dougherty, Renton, WA (US); John H Andersen, Tacoma, WA (US); Stephen D Fulton, Federal Way, WA (US)

(73) Assignee: Naverus, Inc., Renton, WA (US)

Reexamination Request:
No. 95/001,244, Oct. 8, 2009

Reexamination Certificate for:

| | |
|---|---|
| Patent No.: | **7,302,318** |
| Issued: | **Nov. 27, 2007** |
| Appl. No.: | **11/372,565** |
| Filed: | **Mar. 10, 2006** |

Related U.S. Application Data

(60) Provisional application No. 60/662,133, filed on Mar. 10, 2005.

(51) Int. Cl.
*G06F 19/00* (2006.01)

(52) U.S. Cl. ............................ 701/16; 701/18; 701/301; 340/903; 340/970

(58) Field of Classification Search ..................... 701/16
See application file for complete search history.

(56) References Cited

To view the complete listing of prior art documents cited during the proceeding for Reexamination Control Number 95/001,244, please refer to the USPTO's public Patent Application Information Retrieval (PAIR) system under the Display References tab.

*Primary Examiner*—Anjan Deb

(57) ABSTRACT

A method (200) is disclosed for designing an RNP approach for an aircraft at a particular runway (90). The method includes selecting a runway (201), gathering obstacle data for the obstacle evaluation area (202), selecting a VEB method and terms (204), laying out a preliminary approach, inducing a missed approach segment (206), calculating a preliminary obstacle clearance surface (208), calculating a momentary descent segment using a physical model of the aircraft (210), adjusting the obstacle clearance surface so that no obstacles intersect the surface (212), and optionally optimizing the approach by departing from the operator's standard procedures (214). Preferably, the obstacle clearance surface is adjusted so that it just touches an obstacle, without any object intersecting the surface, thereby providing an optimal decision altitude.

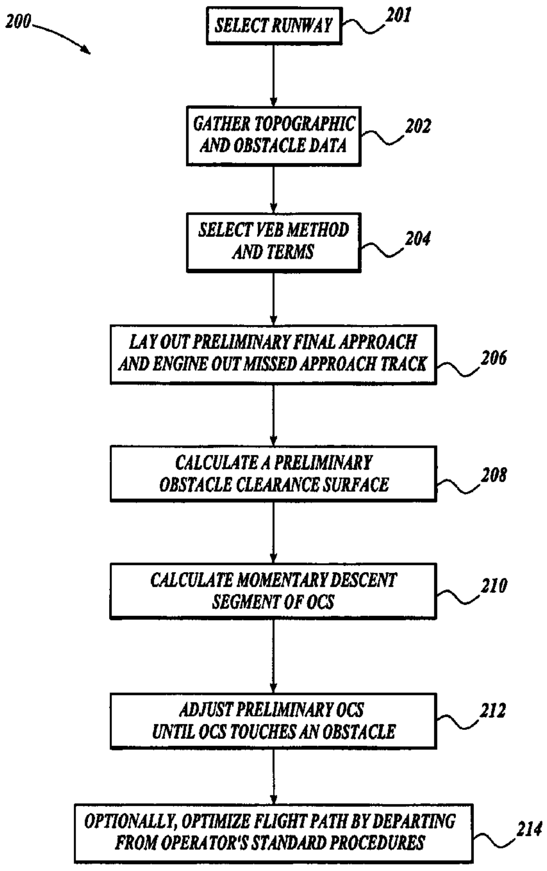

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 10 are determined to be patentable as amended.

Claims 2-9 and 11-12, dependent on an amended claim, are determined to be patentable.

1. A method for designing an approach path for an aircraft approaching a particular runway comprising the steps:

selecting a runway;

gathering topographic data for an obstacle evaluation area for the selected runway, identifying all upwardly projecting obstacles in the obstacle evaluating area;

laying out a preliminary approach path to the runway, including a missed approach segment;

calculating *a final approach obstacle clearance segment of* an obstacle clearance surface for the preliminary approach path;

calculating a momentary descent [portion] *segment* of the obstacle clearance surface *having a proximal end on the final approach obstacle clearance segment by modeling application of thrust upon the initiation of a missed approach;*

*laying out a missed approach segment of the obstacle clearance surface;* adjusting the obstacle clearance surface such that none of the identified obstacles intersects the obstacle clearance surface, wherein the obstacle clearance surface comprises [a] *the* final approach obstacle clearance segment, the momentary descent segment and [a] *the* missed approach segment*; and*

*determining the decision altitude on the preliminary approach path from the proximal end of the momentary descent segment.*

10. A method for designing an aircraft RNP approach for a particular runway having an obstacle evaluation area and a plurality of upwardly-extending obstacles in the obstacle evaluation area, the method comprising the steps:

laying out a preliminary final approach segment;

calculating a first portion of an obstacle clearance surface underlying the preliminary final approach segment using a vertical error budget calculation;

laying out a missed approach segment having a first climb segment that intersects the first portion of the obstacle clearance surface, and such that none of the plurality of upwardly-extending obstacles intersect the missed approach segment;

calculating a momentary descent segment having an initial point on the first portion of the obstacle clearance surface an end point on the missed approach segment, the momentary descent segment *being calculated by* modeling *the application of thrust on* the aircraft *to model a* calculated fight path from initiation of a go-around from the initial point, wherein the initial portion of the obstacle clearance surface, the momentary descent segment and the missed approach segment define the obstacle clearance surface;

adjusting the obstacle clearance surface by sliding the initial point along the first portion of the obstacle clearance surface such that the obstacle clearance surface touches at least one of the plurality of obstructions and none of the plurality of obstructions intersect the obstacle clearance surface; and identifying a decision altitude point at the point along the final approach segment vertically directly above the initial point.

* * * * *